US008310429B2

(12) United States Patent
Wu

(10) Patent No.: US 8,310,429 B2
(45) Date of Patent: Nov. 13, 2012

(54) DISCHARGE CIRCUIT AND LIQUID CRYSTAL DISPLAY USING THE SAME

(75) Inventor: Shao-Qiang Wu, Shenzhen (CN)

(73) Assignee: Chimei Innolux Corporation, Miaoli County (TW)

( * ) Notice: Subject to any disclaimer, the term of this patent is extended or adjusted under 35 U.S.C. 154(b) by 1533 days.

(21) Appl. No.: 11/824,881

(22) Filed: Jul. 2, 2007

(65) Prior Publication Data

US 2008/0001905 A1 Jan. 3, 2008

(30) Foreign Application Priority Data

Jun. 30, 2006 (TW) ............................... 95123845 A

(51) Int. Cl.
*G09G 3/36* (2006.01)
*G02F 1/1333* (2006.01)

(52) U.S. Cl. ............................... 345/98; 345/87; 349/56

(58) Field of Classification Search ............ 345/87–111; 349/56

See application file for complete search history.

(56) References Cited

U.S. PATENT DOCUMENTS

| | | | | |
|---|---|---|---|---|
| 5,952,990 | A | 9/1999 | Inoue et al. | |
| 6,903,734 | B2 | 6/2005 | Eu | |
| 7,193,274 | B2 * | 3/2007 | Liu et al. | 257/355 |
| 7,724,060 | B2 * | 5/2010 | Tokunaga et al. | 327/299 |

FOREIGN PATENT DOCUMENTS

| | | | |
|---|---|---|---|
| CN | 2516996 | Y | 10/2002 |
| TW | 555119 | Y | 9/2003 |

* cited by examiner

*Primary Examiner* — Srilakshmi K Kumar

(74) *Attorney, Agent, or Firm* — WPAT PC; Justin King

(57) ABSTRACT

An exemplary discharge circuit (220) includes a first input terminal (2202); a transistor (2204) having a gate electrode, a drain electrode, and a source electrode; a resistance (2205); and a control circuit (2203) provided to control a voltage applied to the gate electrode of the transistor. The source electrode of the transistor is connected to the first input terminal, and the drain electrode of the transistor is grounded via the resistance. Electric charge from the first input terminal is discharged through the transistor and the resistance under control of the control circuit. A liquid crystal display (LCD) (2) employing the discharge circuit exhibits few or no residual images.

13 Claims, 2 Drawing Sheets

DISCHARGE CIRCUIT AND LIQUID CRYSTAL DISPLAY USING THE SAME

FIELD OF THE INVENTION

The present invention relates to discharge circuits such as those used in liquid crystal displays (LCDs); and particularly to a discharge circuit used for eliminating residual images, and an LCD incorporating the discharge circuit.

GENERAL BACKGROUND

An LCD has the advantages of portability, low power consumption, and low radiation. Therefore, the LCD has been widely used in various portable information products, such as notebooks, personal digital assistant (PDA), video cameras, and the like. Furthermore, the LCD is considered by many to have the potential to completely replace cathode ray tube (CRT) monitors and televisions.

In general, an LCD includes a gate driver and a data driver. The gate and data drivers drive thin film transistors (TFTs) of an LCD panel of the LCD to display images on a display screen of the LCD panel. Usually, an external power supply provides an operating voltage to enable the gate driver and the data driver to function. When the LCD operates, much electric charge is stored at the gate driver and the data driver. When the LCD is powered off, the electric charge stored at the gate driver and the data driver cannot discharge quickly. That is, the voltage at the gate driver and the data driver only drops slowly. As a result, it is difficult to rapidly shut off the TFTs. Therefore when the LCD is powered off, a voltage from the data driver is still applied to source electrodes of the TFTs, and this produces a so-called residual image on the display screen of the LCD panel.

For the purpose of eliminating residual images, it is common to provide a resistance between a power supply terminal of the gate driver and ground. When the LCD is powered off, the electric charge stored at the gate driver can be discharged quickly through the resistance. That is, the voltage on the gate driver drops quickly and the TFTs connected to the gate driver are shut off as soon as the LCD is powered off. Therefore the voltage from the data driver is not applied to the drain electrodes of the TFTs, and residual images are reduced or eliminated.

However, when the gate driver operates, there is current flowing through the resistance. This increases the power consumption of the LCD.

What is needed, therefore, is a discharge circuit and a liquid crystal display employing the discharge circuit that can overcome the above-described deficiencies.

SUMMARY

A discharge circuit includes a first input terminal; a transistor having a gate electrode, a drain electrode, and a source electrode; a resistance; and a control circuit provided to control a voltage applied to the gate electrode of the transistor. The source electrode of the transistor is connected to the first input terminal, and the drain electrode of the transistor is grounded via the resistance. Electric charge from the first input terminal is discharged through the transistor and the resistance under the control of control circuit.

A liquid crystal display includes a driving circuit provided to drive the liquid crystal display, and a discharge circuit. The discharge circuit includes a first input terminal; a transistor having a gate electrode, a drain electrode, and a source electrode; a resistance; and a control circuit provided to control a voltage applied to the gate electrode of the transistor. The source electrode of the transistor is connected to the first input terminal, and the drain electrode of the transistor is grounded via the resistance. Electric charge stored on the driving circuit is discharged through the first input terminal, the transistor, and the resistance under control of the control circuit.

Other novel features and advantages will become more apparent from the following detailed description when taken in conjunction with the accompanying drawings.

DETAILED DESCRIPTION OF PREFERRED EMBODIMENTS

Reference will now be made to the drawings to describe the preferred embodiments in detail.

Figure 1:
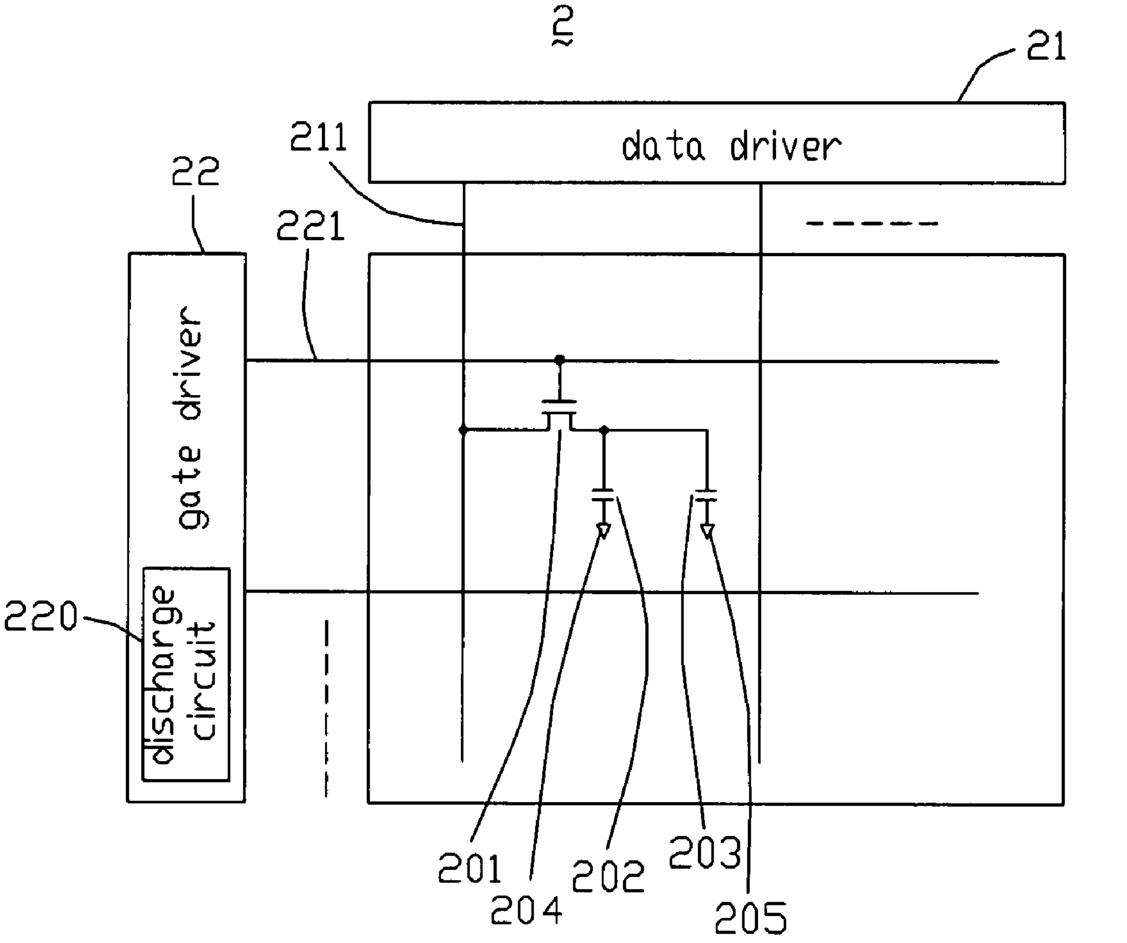
FIG. 1 is a schematic, abbreviated diagram of certain components of a TFT substrate of an LCD according to an exemplary embodiment of the present invention.

FIG. 1 is a schematic, abbreviated diagram of certain components of a TFT substrate of an LCD according to an exemplary embodiment of the present invention. The LCD 2 typically includes a color filter substrate (not shown), the TFT substrate which is positioned generally opposite to the color filter substrate, and a liquid crystal layer (not shown) sandwiched between the two substrates. The TFT substrate includes a plurality of data lines 211 that are parallel to each other and that each extend along a first direction; a plurality of gate lines 221 that are parallel to each other and that each extend along a second direction orthogonal to the first direction; a plurality of pixel units (not labeled) defined by the intersecting gate lines 221 and data lines 211; a data driver 21 provided to drive the data lines 211; and a gate driver 22 provided to drive the gate lines 221.

Each pixel unit includes a TFT 201, a liquid crystal capacitance 202, and a storage capacitance 203. In each pixel unit, a gate electrode (not labeled) of the TFT 201 is electrically connected to a corresponding gate line 221, a source electrode (not labeled) of the TFT 201 is electrically connected to a corresponding data line 211, and a drain electrode (not labeled) of the TFT 201 is electrically connected to a corresponding pixel electrode (not shown). The pixel electrode, a common electrode 204, and liquid crystal (not shown) sandwiched between the pixel electrode and common electrode 204 cooperatively define the liquid crystal capacitance 202. The pixel electrode, a common line 205 electrically connected with the common electrode 204, and an insulating layer (not shown) sandwiched between the pixel electrode and the common line 205 cooperatively define the storage capacitance 203.

Figure 2:
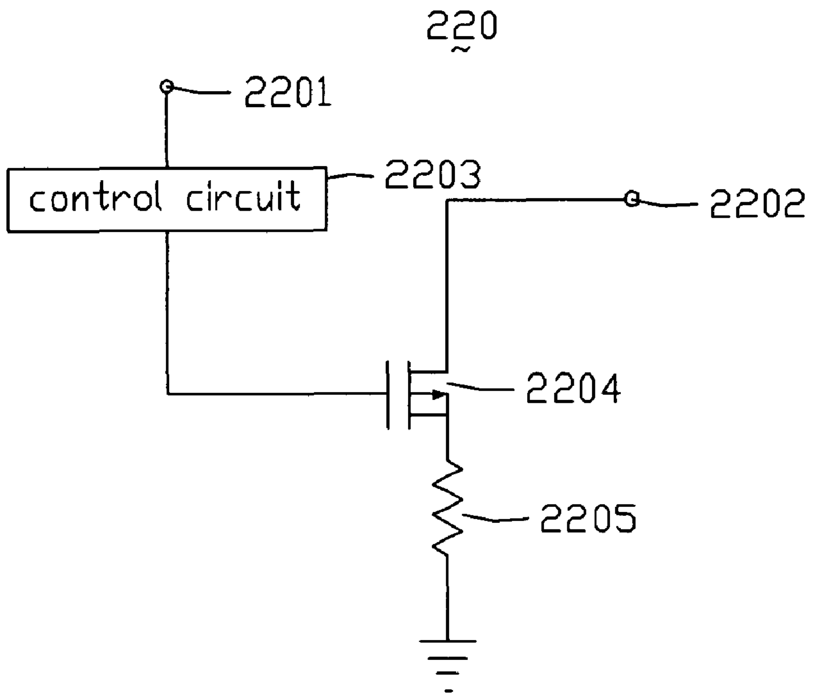
FIG. 2 is a diagram of a discharge circuit of a gate driver of the TFT substrate of FIG. 1.

The gate driver 22 includes a discharge circuit 220. FIG. 2 is a diagram of the discharge circuit 220. The discharge circuit 220 includes a first input terminal 2202, a second input terminal 2201, a transistor 2204 used as a switch, a resistance 2205, and a control circuit 2203 provided to control the voltage on a gate electrode (not labeled) of the transistor 2204.

The first input terminal 2202 of the discharge circuit 220 is electrically connected to a power input terminal (not shown) of the gate driver 22. The second input terminal 2201 of the discharge circuit 220 is electrically connected to the control circuit 2203. A drain electrode (not labeled) of the transistor 2204 is electrically connected to the first input terminal 2202 of the discharge circuit 220. A source electrode (not labeled) of the transistor 2204 is grounded via the resistance 2205. A gate electrode of the transistor 2204 is electrically connected to an output terminal (not labeled) of the control circuit 2203.

Figure 3:
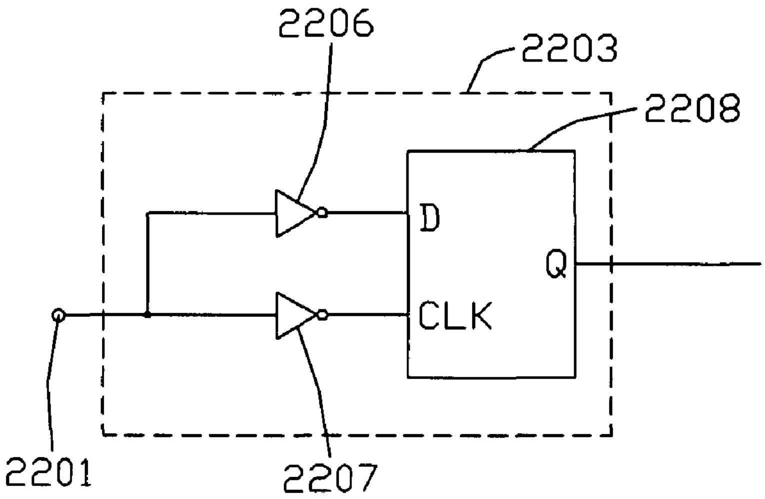
FIG. 3 is a diagram of a control circuit of the discharge circuit of FIG. 2.

FIG. 3 is a diagram of the control circuit 2203. The control circuit 2203 includes a first inverter 2206, a second inverter 2207, and a D flip-flop 2208. The second input terminal 2201 of the discharge circuit 220 is electrically connected to a D input terminal and a CLK input terminal of the D flip-flop 2208 via the first inverter 2206 and the second inverter 2207, respectively. A Q output terminal of the D flip-flop 2208 is the output terminal of the control circuit 2203.

In use of the LCD 2, when the gate driver 22 operates, the LCD 2 generates an "OFF" signal, and supplies the "OFF" signal to the second input terminal 2201 of the discharge circuit 220. Then the control circuit 2203 outputs a low voltage (0V) to turn off the transistor 2204. Thereby, there is no current flowing through the resistance 2205. When the gate driver 22 is powered off, the LCD 2 generates an "ON" signal, and supplies the "ON" signal to the second input terminal 2201 of the discharge circuit 220. Then the control circuit 2203 outputs a high voltage (3.3V) to turn on the transistor 2204. Therefore, the power input terminal of the gate driver 22 is grounded via the transistor 2204 and the resistance 2205. The electric charge stored on the gate driver 22 can be discharged quickly through the first input terminal 2202, the transistor 2204, and the resistance 2205. Thereby, the voltage on the gate driver 22 drops quickly and the TFTs 201 connected to the gate driver 22 are shut off as soon as the gate driver 22 is powered off. Thus, a voltage from the data driver 21 is not applied to the drain electrodes of the TFTs 201.

When the gate driver 22 operates, the transistor 2204 is turned off, and there is no current flowing through the resistance 2205. This minimizes the power consumption of the LCD 2. Moreover, when the gate driver 22 is powered off, the electric charge stored on the gate driver 22 can be discharged quickly through the first input terminal 2202, the transistor 2204, and the resistance 2205. Thereby, the voltage on the gate driver 22 drops quickly and the TFTs 201 connected to the gate driver 22 are shut off as soon as the gate driver 22 is powered off. Thus, the voltage from the data driver 21 is not applied to the drain electrodes of the TFTs 201. Accordingly, a display screen of the LCD 2 exhibits few or no residual images.

Various modifications and alterations of the exemplary embodiment are possible, as are various alternative embodiments. For example, the gate driver 22 and the data driver 21 can cooperatively define a driving circuit, and the discharge circuit 220 can be provided in the data driver 21 of the driving circuit.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A discharge circuit, comprising:

a first input terminal;

a transistor comprising a gate electrode, a drain electrode, and a source electrode;

a resistance;

a control circuit configured for controlling a voltage applied to the gate electrode of the transistor; and a second input terminal connected to the control circuit;

wherein the source electrode of the transistor is connected to the first input terminal, the drain electrode of the transistor is grounded via the resistance, and electric charge from the first input terminal is discharged through the transistor and the resistance under control of the control circuit; and wherein the control circuit comprises a first inverter, a second inverter, and a D flip-flop, the D flip-flop comprises a D input terminal, a CLK input terminal, and a Q output terminal, the second input terminal of the control circuit is connected to the D input terminal and the CLK input terminal via the first and second inverters respectively, and the Q output terminal of the control circuit is connected to the gate electrode of the transistor.

2. A liquid crystal display, comprising:

a driving circuit provided to drive the liquid crystal display; and a discharge circuit, comprising:

a first input terminal;

a resistance;

a transistor comprising a gate electrode, a drain electrode, and a source electrode;

a control circuit configured for controlling a voltage applied to the gate electrode of the transistor; and a second input terminal connected to the control circuit;

wherein the source electrode of the transistor is connected to the first input terminal, the drain electrode of the transistor is connected to ground via the resistance, and electric charge stored on the driving circuit is discharged through the first input terminal, the transistor and the resistance under control of the control circuit; and wherein the control circuit comprises a first inverter, a second inverter, and a D flip-flop, the D flip-flop comprises a D input terminal, a CLK input terminal, and a Q output terminal, the second input terminal of the control circuit is connected to the D input terminal and the CLK input terminal via the first and second inverters respectively, and the Q output terminal of the control circuit is connected to the gate electrode of the transistor.

3. The liquid crystal display as claimed in claim 2, wherein the driving circuit comprises a data driver and a gate driver, and the discharge circuit is provided in the gate driver.

4. The liquid crystal display as claimed in claim 3, wherein the second input terminal is configured to receive a signal to allow the control circuit to turn on the transistor to define a discharge path to discharge the electric charge stored on the driving circuit through the first input terminal, the transistor and the resistance when the gate driver is powered off.

5. The liquid crystal display as claimed in claim 2, wherein the driving circuit comprises a data driver and a gate driver, and the discharge circuit is provided in the data driver.

6. The liquid crystal display as claimed in claim 2, further comprising a color filter substrate, a TFT substrate, and a liquid crystal layer sandwiched between the color filter substrate and the TFT substrate.

7. The liquid crystal display as claimed in claim 6, wherein the TFT substrate comprises a plurality of data lines that are parallel to each other and that each extend along a first direction, a plurality of gate lines that are parallel to each other and that each extend along a second direction orthogonal to the first direction, and a plurality of pixel units defined by the intersecting gate lines and data lines.

8. The liquid crystal display as claimed in claim 7, wherein each pixel unit comprises a thin film transistor and a pixel electrode, a gate electrode of the thin film transistor is connected to a corresponding one of the gate lines, a source electrode of the thin film transistor is connected to a corresponding one of the data lines, and a drain electrode of the thin film transistor is connected to the pixel electrode.

9. The liquid crystal display as claimed in claim 8, wherein each pixel unit further comprises a liquid crystal capacitance.

10. The liquid crystal display as claimed in claim 9, further comprising a common electrode, wherein the liquid crystal capacitance of each pixel unit is cooperatively formed by the pixel electrode, the common electrode, and liquid crystal of the liquid crystal layer sandwiched between the pixel and common electrodes.

11. The liquid crystal display as claimed in claim 8, wherein each pixel unit further comprises a storage capacitance.

12. The liquid crystal display as claimed in claim 11, further comprising an insulating layer and a common line, wherein the storage capacitance of each pixel unit is cooperatively formed by the pixel electrode, the common line, and the insulating layer sandwiched between the pixel electrode and the common line.

13. The liquid crystal display as claimed in claim 2, wherein the driving circuit comprises a gate driver, and the second input terminal is configured to receive a signal to allow the control circuit to turn on the transistor to define a discharge path to discharge the electric charge stored on the driving circuit through the first input terminal, the transistor and the resistance when the gate driver is powered off.

* * * * *